(12) United States Patent
Swales

(10) Patent No.: US 6,569,048 B1
(45) Date of Patent: May 27, 2003

(54) TANDEM TORQUE CONVERTER

(75) Inventor: Shawn H. Swales, Canton, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 10/058,515

(22) Filed: Jan. 28, 2002

(51) Int. Cl.$^7$ .............................................. F16H 47/10
(52) U.S. Cl. ........................................ 475/33; 74/730.1
(58) Field of Search ........................... 475/33; 74/730.1

(56) References Cited

U.S. PATENT DOCUMENTS

| | | | | |
|---|---|---|---|---|
| 2,063,471 | A | * 12/1936 | Stedfeld | 74/730.1 |
| 2,213,349 | A | * 9/1940 | Seibold | 74/730.1 |
| 2,378,085 | A | * 6/1945 | Jandasek | 475/33 |
| 2,634,626 | A | * 4/1953 | Douglas | 475/33 |
| 3,518,898 | A | * 7/1970 | Wagner | 475/33 |
| 3,944,034 | A | * 3/1976 | Ahlen | 475/33 |
| 5,285,111 | A | 2/1994 | Sherman | |
| 5,427,196 | A | 6/1995 | Yamaguchi et al. | |
| 5,562,565 | A | 10/1996 | Moroto et al. | |
| 5,697,466 | A | 12/1997 | Moroto et al. | |
| 5,789,823 | A | 8/1998 | Sherman | |
| 6,008,545 | A | 12/1999 | Nagano et al. | |
| 6,208,036 | B1 | 3/2001 | Evans et al. | |

* cited by examiner

Primary Examiner—Dirk Wright
(74) Attorney, Agent, or Firm—MacMillan, Sobanski & Todd, LLC

(57) ABSTRACT

A vehicle powertrain including a torque converter assembly having tandem torque converter sub-assemblies. An impeller, a turbine and a stator in the first sub-assembly are rotationally coupled to an impeller, a turbine and a stator of the second sub-assembly, with one of the three types of rotating elements preferably coupled to the other via a gear set. The two torque converter sub-assemblies can be axially adjacent to one another, allowing for a reduction in the diameter of the torque converter assembly, or they can be radially adjacent to one another, allowing for a reduction in the axial length of the torque converter assembly. The vehicle powertrain driving the torque converter assembly may include an engine, a motor or both.

20 Claims, 2 Drawing Sheets

TANDEM TORQUE CONVERTER

BACKGROUND OF INVENTION

The present invention relates to torque converters employed in the drivetrain of vehicles, and more particularly to multiple torque converters employed in a single drivetrain.

Conventionally, automotive vehicles where powered with an internal combustion engine only. More recently, some automotive vehicles are powered with what is called a hybrid system. This hybrid system often includes an internal combustion engine that operates in parallel with a motor, with either or both supplying the torque to the transmission. For completely new vehicles, one can account for the different packaging space required for these hybrid powertrains, but for existing vehicles, it may only be economically feasible to fit the hybrid system within the packaging space originally allowed for the conventional system. This packaging problem can be particularly difficult to overcome with a transverse engine, front wheel drive, automatic transaxle configuration. Now, where conventionally an engine, torque converter, and transaxle (or transmission if rear wheel drive) were located, there also needs to be space for a motor.

Thus, it is desirable to have a vehicle powertrain that overcomes the drawbacks of the conventional torque converter configuration by allowing flexibility in packaging the torque converter between an engine and a transmission or transaxle.

SUMMARY OF INVENTION

In its embodiments, the present invention contemplates a torque converter assembly for receiving torque from an engine crankshaft assembly and transmitting torque to a transmission input shaft. The torque converter assembly includes a first torque converter sub-assembly having a first impeller adapted to be rotationally driven by the crankshaft assembly, a first turbine mounted adjacent the first impeller and drivable thereby, the first turbine adapted to be rotationally coupled to the transmission input shaft, and a first stator mounted between the first turbine and the first impeller. The torque converter assembly also includes a second torque converter sub-assembly having a second impeller rotationally coupled to the first impeller, a second turbine mounted adjacent the second impeller and drivable thereby, the second turbine rotationally coupled to the first turbine, and a second stator mounted between the second turbine and the second impeller. A first one-way clutch is rotationally coupled to at least one of the first stator and the second stator, and a stator shaft, which is rotationally fixed, is coupled to the first one-way clutch.

An embodiment of the present invention allows a tandem torque converter assembly to produce the torque of a conventional torque converter, while allowing for a reduced diameter of the torque converter assembly.

An embodiment of the present invention allows a tandem torque converter assembly to produce the torque of a conventional torque converter, while allowing for a reduced length of the torque converter assembly.

An advantage of the present invention is that the overall torque converter assembly can be made a smaller diameter or a shorter length in order to allow for packaging a motor in parallel with an engine in a hybrid powertrain type of arrangement.

Another advantage of the present invention is that a tandem torque converter arrangement can be employed to allow for a smaller diameter or a shorter length when employed with only a conventional engine, if packaging space within the vehicle engine compartment so requires.

DETAILED DESCRIPTION

Figure 1:
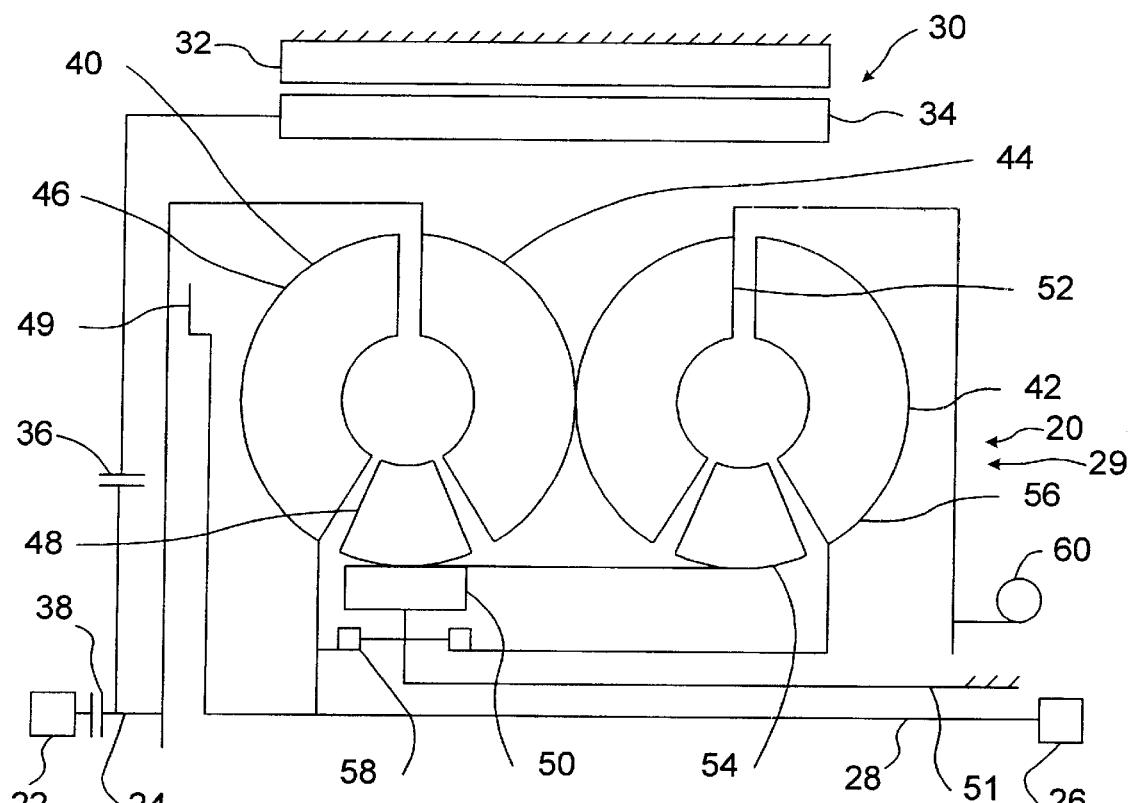
FIG. 1 is a schematic view of a vehicle drivetrain, including tandem torque converters, in accordance with an embodiment of the present invention.
Figure 2:
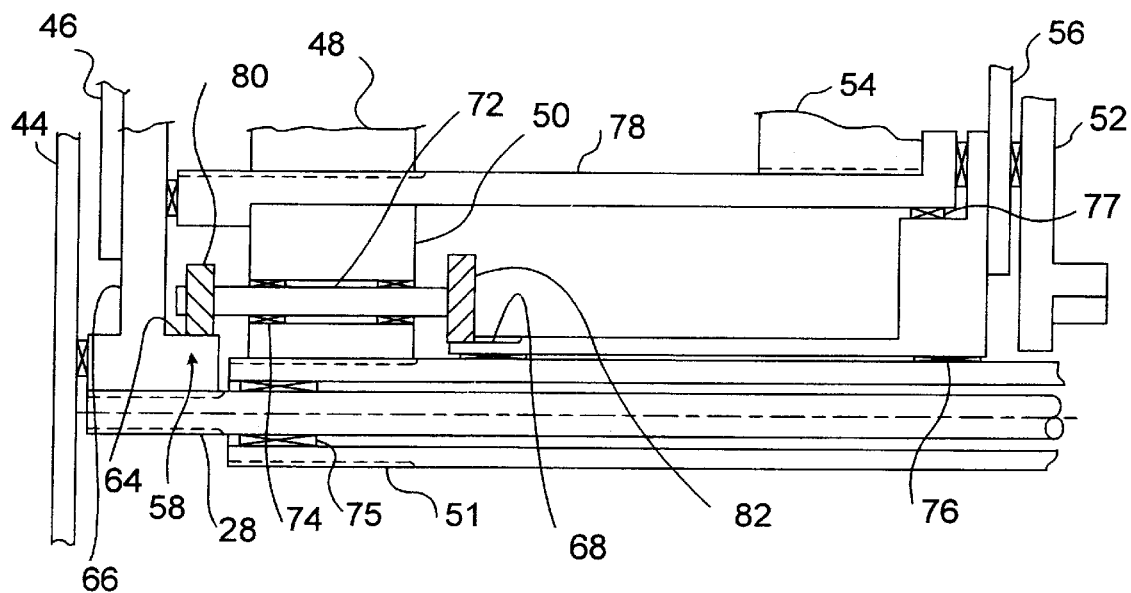
FIG. 2 is a cross section view of a portion of the tandem torque converters of FIG. 1, including a gear set coupling turbines together.

FIGS. 1 and 2 illustrate a vehicle drivetrain 20 having an engine 22, which includes a crankshaft assembly 24 (which may include a flywheel or flexplate), and a transmission 26 (or transaxle), which includes an input shaft 28. The crankshaft assembly 24 and the transmission input shaft 28 are rotationally coupled together via a torque converter assembly 29. Most the components illustrated are symmetrical about a main axis of rotation about which the crankshaft assembly 24 and the transmission input shaft 28 rotate, and so generally only the portion of the components above this axis of rotation is illustrated in the figures herein.

This drivetrain 20 also includes a motor/generator 30 having a stator 32, which is rotationally fixed, and a rotor 34, which is selectively coupled to the crankshaft assembly 24 via a clutch 36. While the rotor 34 is shown rotationally coupled to the crankshaft 24, it can instead be rotationally coupled to the transmission input shaft, the impellers, or turbines, if so desired. This depends upon the packaging space, desired operating characteristics and strategy, and other factors. Further, the crankshaft assembly 24 may include a clutch 38 to allow the motor 30 to drive the torque converter assembly 29 when the engine is turned off.

The torque converter assembly 29 has a first torque converter sub-assembly 40 and a second torque converter sub-assembly 42 axially adjacent to the first. The first sub-assembly 40 includes a first impeller assembly 44, which is rotationally connected to and driven by the crankshaft 24, a first turbine assembly 46, which is rotationally connected to and drives the transmission input shaft 28, and a first stator assembly 48, which is connected to the transmission housing (or otherwise rotationally grounded) via a first one-way clutch 50 and a stator shaft 51.

A bypass (lockup) clutch 49 is connected to and rotates with the transmission input shaft 28, and can be selectively engaged with the first impeller assembly 44. This allows torque to be transmitted directly from the crankshaft assembly 24 to the transmission input shaft 28, selectively bypassing the torque converter assembly 29 under certain vehicle operating conditions.

The second sub-assembly 42 includes a second impeller assembly 52, which is connected to and rotates with the first impeller assembly 44. A transmission oil pump 60 is rotationally connected to and driven by the second impeller 52. This allows the oil pump 60 to be driven the same as it is with a conventional torque converter arrangement. The second sub-assembly 42 also includes a second stator assembly 54, which is directly connected to and rotates with the first stator assembly 48. Since the two stators 48, 54 are rotationally fixed to each other, only the first one-way clutch 50 is required.

A second turbine assembly 56 is included in the second sub-assembly 42. The second turbine 56 is rotationally coupled to the first turbine 46 via a gear set 58. The reason for the gear set 58 is because there are three rotating elements in each of the sub-assemblies, and by directly tying two of the three elements in the first sub-assembly 40 to their counterparts in the second sub-assembly 42, that leaves the remaining rotating element (in this embodiment the first turbine 46) rotationally isolated from its counterpart element (the second turbine 56). The gear set 58 allows the two turbines 46, 56 to be rotationally coupled such that the two rotate together to drive the transmission input shaft 28.

FIG. 2 illustrates how the gear set 58 couples the first turbine 46 to the second turbine 56, and allows the various sets of components to rotate independently of each other. The gear set 58 includes a first sun gear 64 formed on a hub portion 66 of the first turbine assembly 46, and a second sun gear 68 formed on a hub portion 70 of the second turbine assembly 56. The hub portion 66 of the first turbine 46 mounts directly to the transmission input shaft 28, while the hub portion 70 of the second turbine 56 mounts around the stator shaft 51 via a set of bearings 76. The stator shaft 51, which does not rotate, is mounted about the transmission input shaft 28 via bearings 75, in a conventional fashion. Also a stator support portion 78 of the second stator 54 is mounted around the hub portion 70 of the second turbine 56 via a bearing 77. This stator support portion 78 is also connected to the first stator 48.

A set of gear shafts 72 each extend through the first one-way clutch 50 and are mounted on bearings 74 that allow the gear shafts 72 and clutch 50 to rotate independently of each other. A pair of planet gears are mounted on opposite ends of the gear shaft 72, with a first set of planet gears 80 engaging the first sun gear 64, and a second set of planet gears 82 engaging the second sun gear 68. Preferably, there are three shafts 72 and three sets of planet gears 80, 82, although other numbers of shafts and gears may also be employed.

With this arrangement, then, the stators 48, 55 can be rotationally coupled, the turbines 46, 56 can be rotationally coupled, and the impellers 44, 52 can be rotationally coupled, while still allowing each of these three main types of rotating elements to rotate independently of one another.

In operation, the engine 22 and/or motor 30 drives the crankshaft assembly 24, depending upon which of the clutches 36, 38 is engaged and whether the stator 32 is being supplied with power from a battery (not shown). The crankshaft assembly 24 in turn drives the first impeller assembly 44. Since the second impeller assembly 52 is rotationally fixed to the first, it is also driven by the crankshaft assembly 24. The two impellers 44, 52 will then drive the fluid within them at the same velocity, which will cause the two turbines 46, 56 to rotate. Since the second turbine assembly 56 is coupled to the first turbine assembly 46 via the gear set 58, both will rotate at the same velocity and contribute to the torque transferred to the transmission input shaft 28. The one-way clutch 50 connects to the first stator 48 in a conventional fashion, and so it will lock the stator 48 when the first impeller 44 is turning faster than the first turbine 46, as is the case in a conventional torque converter. Further, since the second stator 54 is rotationally coupled to the first stator 48, the one-way clutch 50 will lock the second stator 54 at the same time. Consequently, while there are two separate torque converter subassemblies 40, 42, they will each work in a conventional fashion to supply torque to the transmission input shaft 28. Additionally, when the bypass clutch 49 is engaged, it will transfer the torque directly to the transmission input shaft 28, bypassing both of the torque converters, as is the case in a conventional torque converter.

Figure 3:
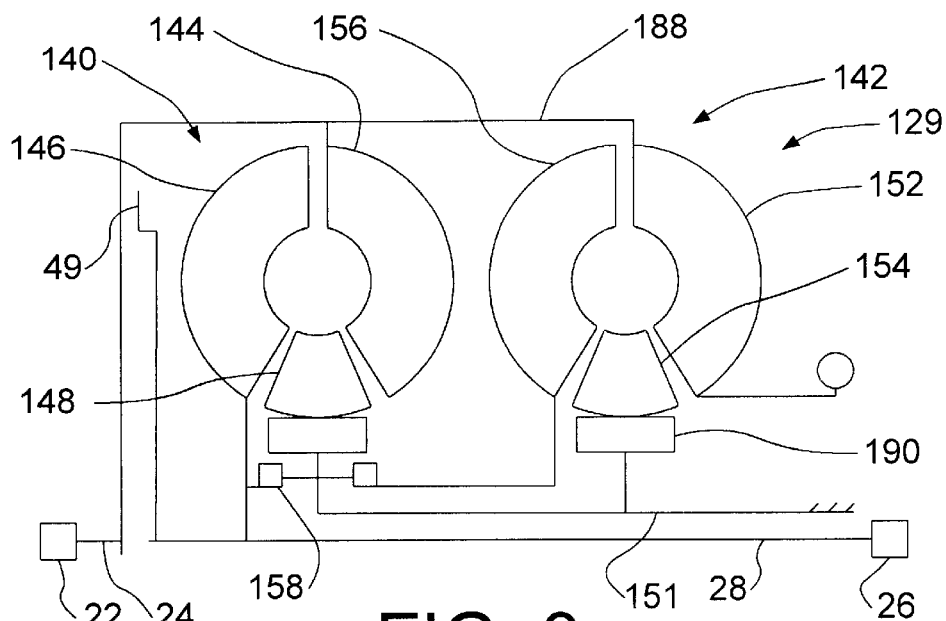
FIG. 3 is a is a schematic view similar to FIG. 1, but illustrating a second embodiment of the present invention.

FIG. 3 illustrates a second embodiment of the present invention. In this embodiment, elements that are the same as in the first embodiment will be designated with the same element numbers, but those that have changed or been added will be designated with 100 series numbers. The engine 22, crankshaft assembly 24 (without clutch shown), transmission 26, transmission input shaft 28, bypass clutch 49 and motor/generator (not shown) are the same.

The torque converter assembly 129 is different than the first embodiment in that, while the first torque converter sub-assembly 140 is oriented the same, the second torque converter sub-assembly 142 is reversed so that the sub-assembly 142 has its turbine 156 adjacent to the impeller 144 of the first torque converter sub-assembly 140. As a consequence, the impellers 144, 152 are now coupled via a connector 188. The second turbine 156 is still coupled to the first turbine 146 via the gear set 158. Due to the different orientation, however, the second stator 154 does not directly couple to the first stator 148. So it now requires a second one-way clutch 190, which couples directly to the stator shaft 151. The operation of the torque converter assembly 129 is essentially the same as the first embodiment, and so will not be discussed further.

Figure 4:
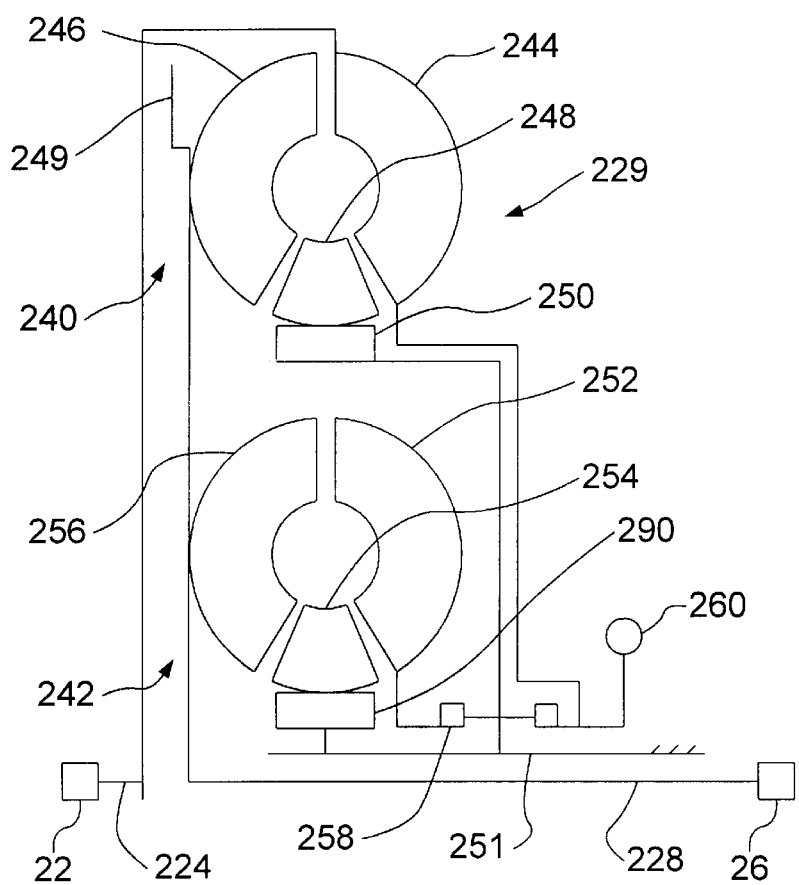
FIG. 4 is a schematic view similar to FIG. 1, but illustrating a third embodiment of the present invention.

FIG. 4 illustrates a third embodiment of the present invention. In this embodiment, elements that are the same as in the first embodiment will be designated with the same element numbers, but those that have changed or been added will be designated with 200 series numbers. The engine 22 and transmission 26 are the same. The torque converter assembly 229 is different than the first embodiment in that, while the first torque converter sub-assembly 240 is oriented the same, it is radially larger in order to allow for the second torque converter sub-assembly 242 to mounted radially inward of the first. This provides for a shorter transmission input shaft 228 and an overall shorter torque converter assembly 229, although now the overall radius is much larger. If so desired, then, a motor/generator (not shown) can be mounted between the torque converter assembly 229 and the transmission 26, or mounted between the engine 22 and the torque converter assembly 229.

The first turbine 246 is now coupled to the second turbine 256 via the bypass clutch 249. The first stator 248 and the second stator 254 are mounted to the first one-way clutch 250 and the second one-way clutch 290, respectively, which in turn, are each coupled to the stator shaft 251. The first impeller 244 is still driven by the crankshaft assembly 224, but the first impeller 244 is now coupled to the second impeller 252 via a gear set 258. The first impeller 244 also drives the oil pump 260.

Other embodiments are possible within the scope of the invention, such as directly connecting the two turbines together and directly connecting the two impellers together, while attaching a gear set between the stators by using a stator hub as a planet carrier. So, while certain embodiments of the present invention have been described in detail, those familiar with the art to which this invention relates will recognize various alternative designs and embodiments for practicing the invention as defined by the following claims.

What is claimed is:

1. A torque converter assembly for receiving torque from an engine crankshaft assembly and transmitting torque to a transmission input shaft, the torque converter assembly comprising:

a first torque converter sub-assembly having a first impeller adapted to be rotationally driven by the crankshaft assembly, a first turbine mounted adjacent the first impeller and drivable thereby, the first turbine adapted to be rotationally coupled to the transmission input shaft, and a first stator mounted between the first turbine and the first impeller;

a second torque converter sub-assembly having a second impeller rotationally coupled to the first impeller, a second turbine mounted adjacent the second impeller and drivable thereby, the second turbine rotationally coupled to the first turbine, and a second stator mounted between the second turbine and the second impeller;

a first one-way clutch rotationally coupled to at least one of the first stator and the second stator; and a stator shaft that is rotationally fixed and is coupled to the first one-way clutch.

2. The torque converter assembly of claim 1 further including a gear set having a first gear coupled to the first turbine and a second gear coupled to the second turbine such that the first and second turbines are rotationally coupled through the gear set.

3. The torque converter assembly of claim 2 wherein the first turbine includes a hub portion, with the hub portion including a first sun gear, and the second turbine includes a second hub portion, with the second hub portion including a second sun gear, and the gear set includes a plurality of gear shafts, with each gear shaft having a first end and an opposed second end, and with each gear shaft including a first planet gear mounted on the first end and in engagement with the first sun gear and a second planet gear mounted on the second end and in engagement with the second sun gear.

4. The torque converter assembly of claim 1 wherein the first one-way clutch is mounted within the first stator, and the first stator is rotationally coupled to the second stator.

5. The torque converter assembly of claim 1 further including a gear set having a first gear coupled to the first impeller and a second gear coupled to the second impeller such that the first and second impellers are rotationally coupled through the gear set.

6. The torque converter assembly of claim 1 further including a bypass clutch that is adapted to be rotationally coupled to the transmission input shaft and is selectively couplable to the first turbine.

7. The torque converter assembly of claim 1 further including an oil pump, with the oil pump rotationally coupled to one of the first impeller and the second impeller.

8. The torque converter assembly of claim 1 wherein the second torque converter sub-assembly is mounted axially adjacent to the first torque converter sub-assembly.

9. The torque converter assembly of claim 8 wherein the second impeller is mounted adjacent to the first impeller.

10. The torque converter assembly of claim 8 wherein the second turbine is mounted adjacent to the first impeller.

11. The torque converter assembly of claim 1 wherein the second torque converter sub-assembly is mounted radially inward of the first torque converter sub-assembly.

12. The torque converter assembly of claim 11 further including a bypass clutch that is adapted to be rotationally coupled to the transmission input shaft and is selectively couplable to one of the first turbine and the second turbine.

13. The torque converter assembly of claim 1 further including a second one-way clutch mounted radially within the second stator, and wherein the first one-way clutch is mounted radially within the second stator, and with the first and the second one-way clutches rotationally coupled to the stator shaft.

14. A vehicle powertrain comprising:

an engine having a crankshaft assembly;

a transmission having an input shaft; and a torque converter assembly including, a first torque converter sub-assembly having a first impeller adapted to be rotationally driven by the crankshaft assembly, a first turbine mounted adjacent the first impeller and drivable thereby, the first turbine adapted to be rotationally coupled to the transmission input shaft, and a first stator mounted between the first turbine and the first impeller; a second torque converter sub-assembly having a second impeller rotationally coupled to the first impeller, a second turbine mounted adjacent the second impeller and drivable thereby, the second turbine rotationally coupled to the first turbine, and a second stator mounted between the second turbine and the second impeller; a first one-way clutch rotationally coupled to at least one of the first stator and the second stator; and a stator shaft that is rotationally fixed and is coupled to the first one-way clutch.

15. The vehicle powertrain of claim 14 further including a motor/generator rotationally couplable to one of the crankshaft assembly and the input shaft.

16. The vehicle powertrain of claim 14 wherein the second torque converter sub-assembly is mounted axially adjacent to the first torque converter sub-assembly.

17. The vehicle powertrain of claim 14 wherein the second torque converter sub-assembly is mounted radially inward of the first torque converter sub-assembly.

18. The vehicle powertrain of claim 14 further including a gear set having a first gear coupled to the first turbine and a second gear coupled to the second turbine such that the first and second turbines are rotationally coupled through the gear set.

19. The vehicle powertrain of claim 14 further including a bypass clutch that is adapted to be rotationally coupled to the transmission input shaft and is selectively couplable to the first turbine.

20. A torque converter assembly for receiving torque from an engine crankshaft assembly and transmitting torque to a transmission input shaft, the torque converter assembly comprising:

a first torque converter sub-assembly having a first impeller adapted to be rotationally driven by the crankshaft assembly, a first turbine mounted adjacent the first impeller and drivable thereby, the first turbine adapted to be rotationally coupled to the transmission input shaft, and a first stator mounted between the first turbine and the first impeller;

a second torque converter sub-assembly, mounted axially adjacent to the first torque converter sub-assembly, and having a second impeller rotationally coupled to the first impeller, a second turbine mounted adjacent the second impeller and drivable thereby, the second turbine rotationally coupled to the first turbine, and a second stator mounted between the second turbine and the second impeller and rotationally coupled to the first stator;

a first one-way clutch rotationally coupled to the first stator; and a stator shaft that is rotationally fixed and is coupled to the first one-way clutch.

* * * * *